United States Patent [19]

Hayashi

[11] Patent Number: 5,718,632
[45] Date of Patent: Feb. 17, 1998

[54] RECORDING MEDIUM, METHOD OF LOADING GAMES PROGRAM CODE MEANS, AND GAMES MACHINE

[75] Inventor: Yoichi Hayashi, Kawasaki, Japan

[73] Assignee: Namco Ltd., Tokyo, Japan

[21] Appl. No.: 563,208

[22] Filed: Nov. 27, 1995

[30] Foreign Application Priority Data

Dec. 2, 1994 [JP] Japan .................. 6-329695

[51] Int. Cl.$^6$ .................................................. A63F 9/22
[52] U.S. Cl. .................................................. 463/44
[58] Field of Search .............................. 463/43, 44, 45

[56] References Cited

U.S. PATENT DOCUMENTS

| | | | |
|---|---|---|---|
| 5,014,982 | 5/1991 | Okada et al. | 463/44 |
| 5,388,841 | 2/1995 | San et al. | 463/44 |
| 5,599,232 | 2/1997 | Darling | 463/45 |

FOREIGN PATENT DOCUMENTS 7-98104  10/1995  Japan .

OTHER PUBLICATIONS

"Hyper Play Station" (vol. 1, Jan. 1995, p. 18) published by Sony Magazines Inc. on Nov. 30, 1994.

"The Play Station" (The first issue, Jan. 1995, p. 29) publishes by Soft Bank Corporation, on Nov. 30, 1994.

"Play Station Tsushin" (Special number of Weekly Famicon Tsushin, Dec. 9, 1994, p. 50) published by ASCII Corporation on Dec. 1, 1994.

"Weekly Famicon Tsushin" (Dec. 16, 1994, p. 118) published by ASCII Corporation on Dec. 2, 1994).

"Haoh" (Dec. 16, 1994) published by Kodansha on Dec. 2, 1994.

*Primary Examiner*—George Manuel
*Attorney, Agent, or Firm*—Oliff & Berridge, PLC

[57] ABSTRACT

A recording medium, a method of loading games program code, and a games machine is provided. The recording medium has a program code relating to an auxiliary game and a program code relating to a main game. The size of the auxiliary game program code is small compared to the size of the main-game program code, and the relationship between the auxiliary game program code and the main-game program code is such that the auxiliary game program code is loaded first, before the main game program code. Unnecessary wastage of time can be prevented by first loading the smaller, auxiliary game program code into the games machine, before the main-game program code is loaded, then loading the main-game program code while the auxiliary game is running.

16 Claims, 12 Drawing Sheets

RECORDING MEDIUM, METHOD OF LOADING GAMES PROGRAM CODE MEANS, AND GAMES MACHINE

BACKGROUND OF THE INVENTION

1. Field of the Invention

This invention relates to a recording medium, a method of loading a games program code means, and a games machine.

2. Description of Related Art

Recent advances in hardware technology have made it possible for games players to use domestic games machines to enjoy the same sort of three-dimensional, action-packed games as those provided in games centers.

A particular trend in recent years is the popularity of domestic games machines of a type in which an external recording medium such as a large-capacity compact disk read-only memory (CD-ROM) can be set in the main unit of the games machine, to make it easy to play exciting games.

The present inventor has performed extensive research into enabling players to improve their skills effortlessly, using more interesting games that can be played at home. The inventor has thus clarified the points discussed below.

A domestic games machine differs from an arcade games machine in that games program and data must be read in from a medium on which game software is recorded, such as a CD-ROM. Therefore, the game cannot be played until this reading has been completed, and thus the time taken by this reading process is a boring waste of time as far as the player is concerned.

A particular problem is caused by the way in which the latest games are far more complicated and the images displayed thereby on the computer monitor are highly realistic. This means that the sizes of games programs and their associated data are increasing and thus a read time of about 10 to 20 seconds is required to read such a games program and its data from a medium such as a CD-ROM into RAM within the games machine. The player can no longer start playing such a game immediately, which is irritating.

One method that has been considered to prevent this problem is to play background music while the game is being loaded but such music has no direct relevance to the game as far as the player is concerned, and thus it somehow gives the impression of wasting time.

SUMMARY OF THE INVENTION

The present invention has been devised in the light of the above described results of the research conducted by the present inventor and has as its objective the provision of a games machine which enables the player to become immersed in a game even faster, and which thus enables a more enjoyable game.

Another objective of this invention is to provide a novel method of reading a games program code means.

Still another objective of this inventor is to provide a model recording medium having a games program code means.

A recording medium in accordance with this invention preferably has program code means relating to an auxiliary game and program code means relating to a main game. The size of the program code means relating to the auxiliary game is small in comparison with the size of the program code means relating to the main game, and the relationship between the program code means relating to the auxiliary game and the program code means relating to the main game is such that the program code means relating to the auxiliary game is always loaded first, before the program code means relating to the main game.

In this document, the phrase "program code means" is used as a collective term covering code that comprises instruction information for a computer and code that comprises information relating to data that is necessary for executing these instructions. The phrase "size of program code means" refers to the volume of instructions and data.

In addition, the phrase "program code means relating to an auxiliary game" refers to control instructions and data relating to another game such as a preliminary game which is loaded before the main game and which is completed in an extremely short period of time. It could equally well refer to control instructions and data for displaying on the monitor an image for setting initial conditions for the subsequent main game.

The recording medium is in preferably a compact medium such as a CD-ROM.

Use of such a recording medium makes it possible to load a small program code means relating to an auxiliary game first, before the program code means relating to the main game is loaded into the games machine. By thus displaying an image on the monitor and running an auxiliary game (preliminary game), for example, the player can rapidly become immersed in a gaming environment.

In addition, if the program and other data of the main game, which has a large quantity of instructions and data, is loaded while the auxiliary game (preliminary game) is running and this main game is run after the preliminary game has ended, the player will not be aware of the time taken for the main game to load.

When a method of loading a games program code means in accordance with this invention is used to load stored information from the above described recording medium of this invention into the games machine, it preferably first loads the program code means relating to the auxiliary game then it loads the program code means relating to the main game.

In addition, the program code means relating to the auxiliary game that was loaded first is preferably processed and the program code means relating to the main game is loaded in parallel while this process is continuing.

Use of such a loading method ensures that the time taken to load the games program and data from the recording medium into the games machine is not wasted as waiting time, so that the player gets the impression that the game-loading process is fast. The player can also become immersed in the game rapidly.

This invention is particularly effective when the main game is extremely big. In other words, if the playing time of the auxiliary game is set as appropriate to suit the time taken for such a large main game to be loaded, there will be no problems, regardless of how long it takes the main game to load.

The configuration is preferably such that the initial conditions of the main game differ according to the result of playing the auxiliary game. In such a case, the auxiliary game is significant as a preliminary round of the main game, making the main game more exciting and interesting.

If the player can select initial conditions for the main game while the main game is being loaded, instead of playing an auxiliary game, the player can become involved in the main game quicker, without feeling that time is being wasted.

A games machine in accordance with this invention preferably has loading means that uses the above described loading method to load the program code means relating to the auxiliary game and the main game from the above-described recording medium of this invention.

In addition to the above loading means, the games machine of this invention preferably has a computer that operates in accordance with the program code means. This computer first performs predetermined process in accordance with an auxiliary program while displaying an image on the monitor. At the same time, the loading means loads the games program and data for the main game in parallel with this predetermined process. After the predetermined process of the auxiliary program has ended, the computer runs the main game while displaying an image on the monitor, using the games program and data for this main game that was loaded by the loading means.

This makes it possible to provide a more sophisticated games machine.

DESCRIPTION OF THE PREFERRED EMBODIMENTS

1. First Embodiment
Hardware Configuration

Figure 2:
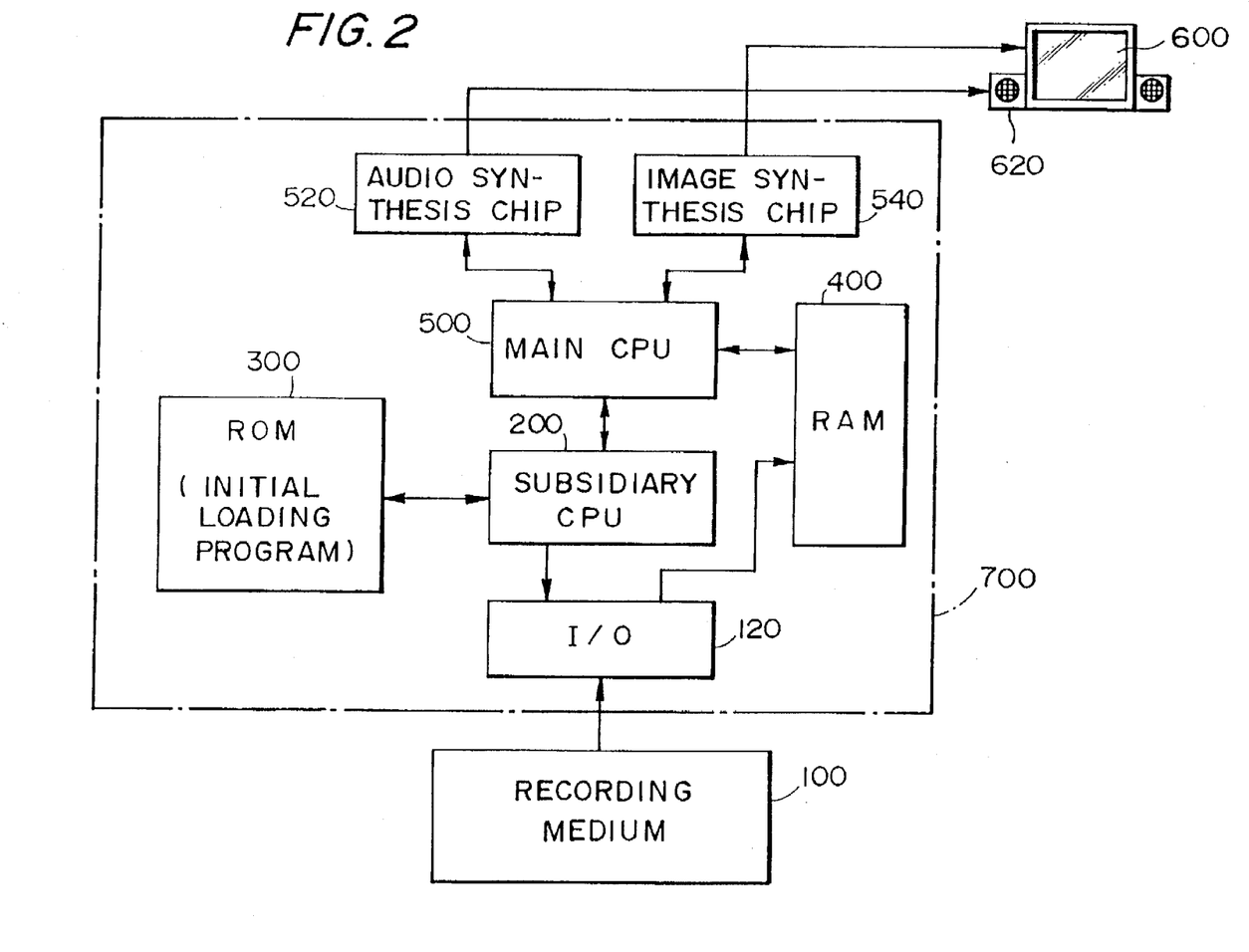
FIG. 2 shows an example of the hardware configuration of an embodiment of the games machine of this invention.

The hardware configuration of an embodiment of the games machine of this invention is shown in FIG. 2.

A games machine 700 of this embodiment is a domestic games machine using an external recording medium 100 such as a CD-ROM in which game software is stored and which is set at a predetermined position.

This games machine 700 is provided with a subsidiary central processing unit (CPU) 200 that controls the operation of loading programs and data from the recording medium, an input-output (I/O) circuit 120, a read-only memory (ROM) 300 containing an initial loading program (a program for loading information from the recording medium into the games machine itself), a random access memory (RAM) 400 for storing data such as program and image data, a main CPU 500 that controls the entire operation of the games machine, an audio synthesis integrated circuit 520, and an image synthesis integrated circuit 540.

A monitor 600 receives video signals that are output from the image synthesis chip 540, and displays a game image.

Similarly, speakers 620 receive audio signals that are output from the audio synthesis chip 520, and output sounds that are necessary for the game.

Figure 3:
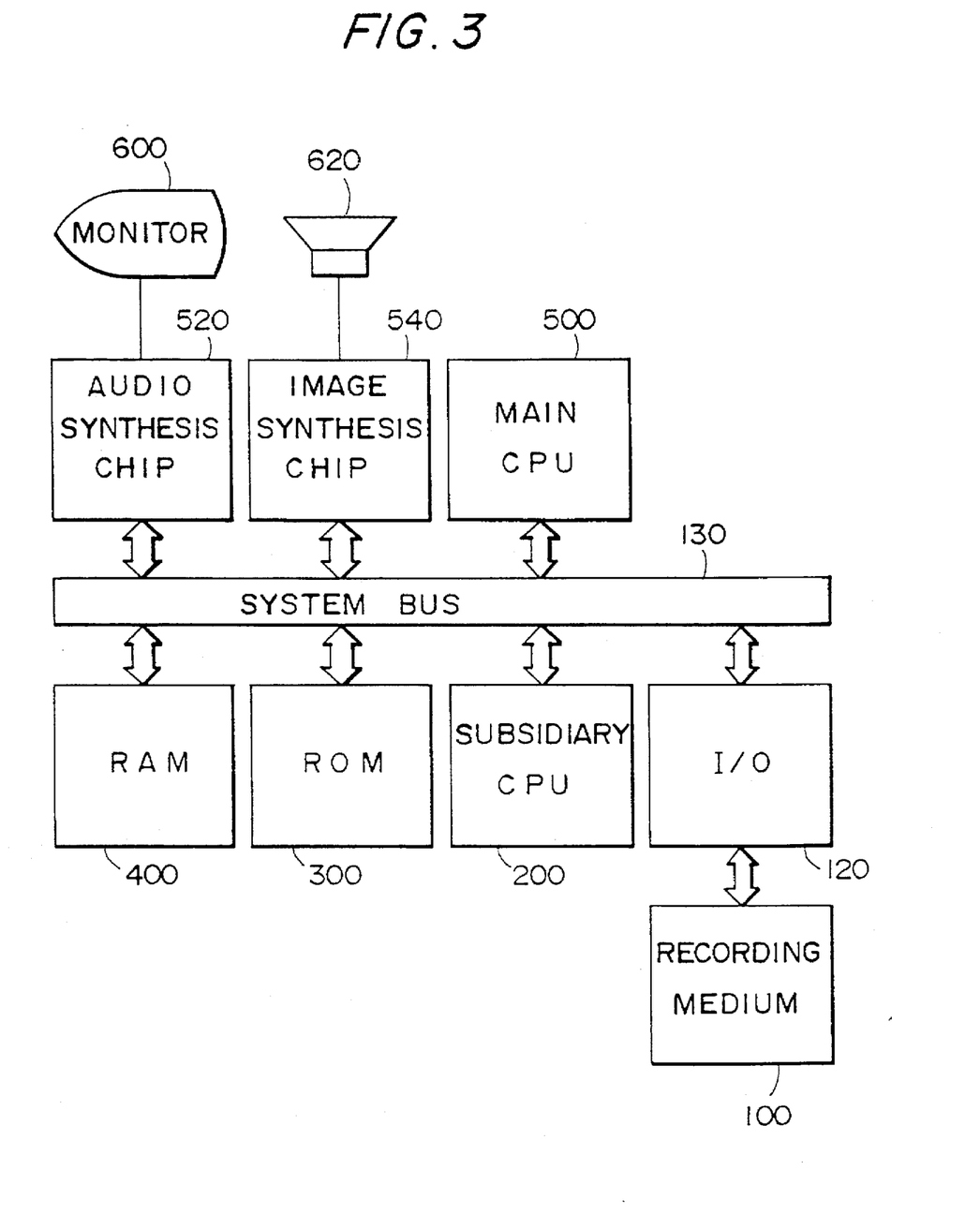
FIG. 3 shows an example of the arrangement of elements shown in FIG. 2.

The configurational elements of FIG. 2 could be arranged as shown in FIG. 3. As shown in this figure, the RAM 400, the ROM 300, the subsidiary CPU 200, the input-output (I/O) circuit 120, the image synthesis chip 540 the audio synthesis chip 520, and the main CPU 500 each transfer information through a system bus 130.

Game Details

Software for a main game and an auxiliary game is stored on the recording medium 100.

Each piece of software is configured of computer readable program code means. In this case, "program code means" is a general term covering both code that comprises instruction information for a computer and code that comprises information concerning data that is necessary when such instructions are executed.

The main game is a large game that requires approximately 10 seconds to be loaded. On the other hand, the auxiliary game is a small game that requires a loading time of only one or two seconds, and the playing time thereof is set to be approximately 15 seconds.

Figure 9:
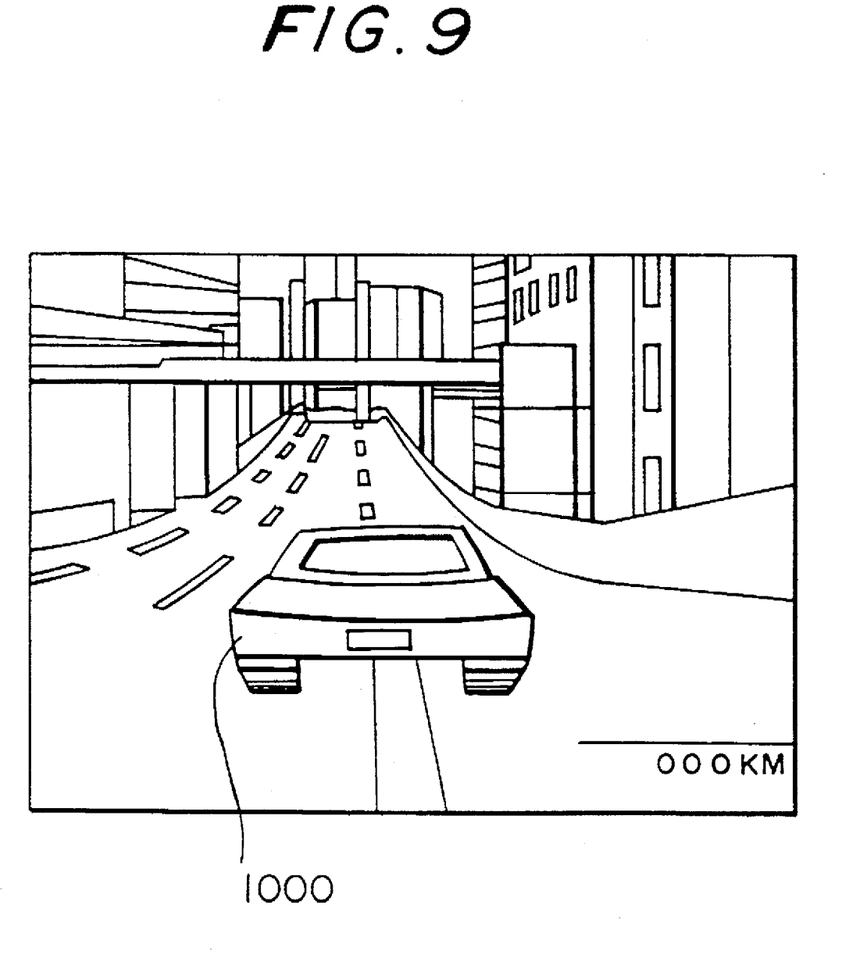
FIG. 9 shows an example of the main game.

In this embodiment, the main game is a racing-car game for testing driving techniques, in which a racing car operated by the player competes against another racing car operated by the computer, as shown in FIG. 9

Figure 7:
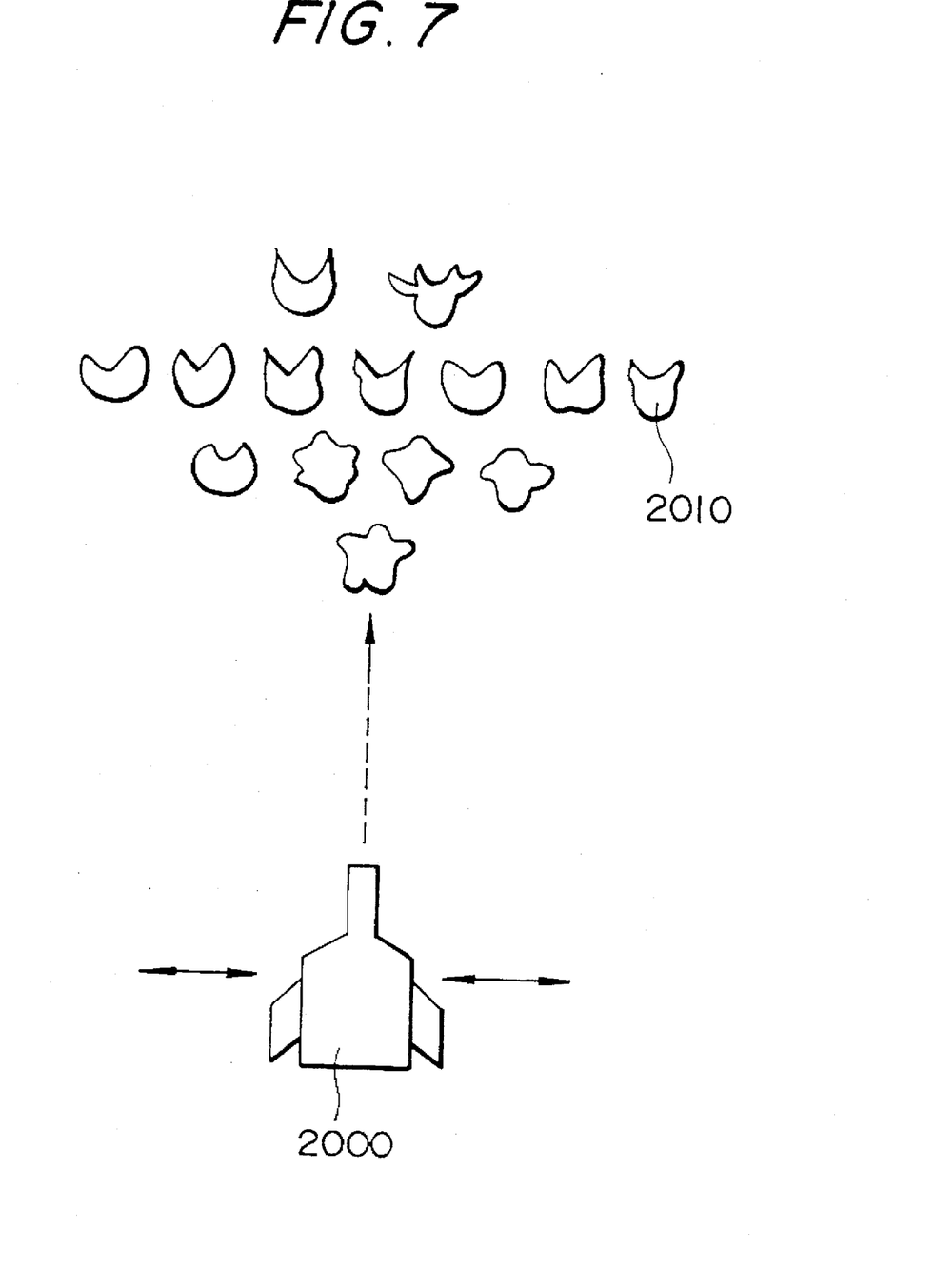
FIG. 7 is a diagram used to illustrate an example of the auxiliary game.

In contrast, the auxiliary game that is executed before the main game is an alien-shooting game such as that shown in FIG. 7. This alien-shooting game is one in which the player fires a laser beam from a starship 2000 to destroy aliens 2010 within a short game time of 15 seconds. The score is the number of aliens destroyed.

With this embodiment, the loading of the program and data for the racing-car game is completed while the alien-shooting game is running.

The initial conditions of the subsequent racing-car game depend on the final state of the alien-shooting game, such as whether or not all of the aliens have been destroyed. In other words, the result of the auxiliary game affects the initial setting of the main game.

Figure 8:
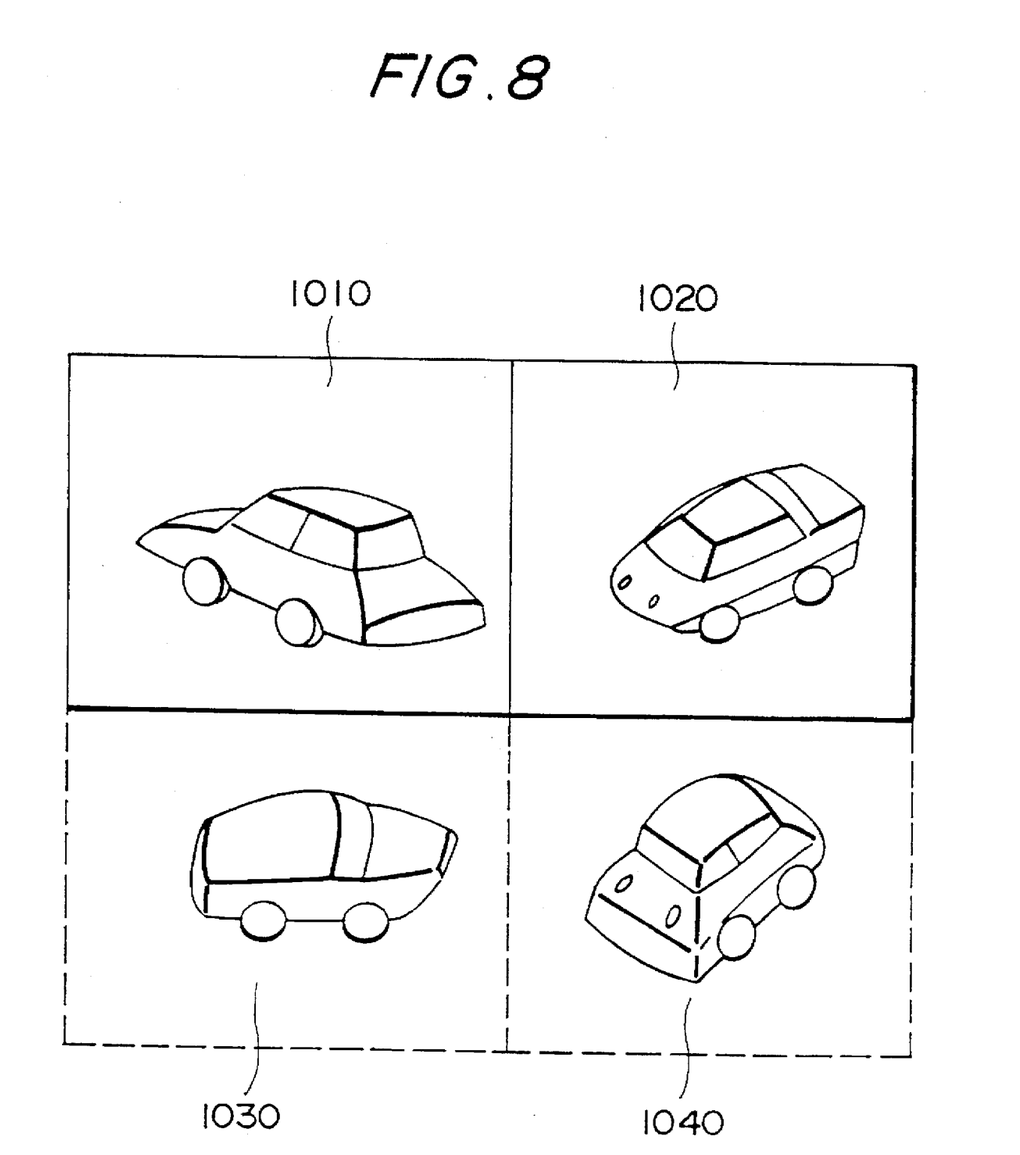
FIG. 8 is a diagram used to illustrate an example of how the result of the auxiliary game can be reflected in the setting of initial conditions for the main game.

For example, if the player was unable to destroy all of the aliens in the preliminary game, the vehicles available for the player to select are limited to racing cars 1010 and 1020 shown in FIG. 8. If the player destroyed all the aliens, all of the racing cars (1010, 1020, 1030, and 1040) shown in FIG. 8 are available for selection. Therefore, a player who has destroyed all of the aliens in the alien-shooting game has a completely free selection of vehicle.

Thus, since the result of the auxiliary game relates to the conditions of the main game, the player can quickly become immersed in the game from the pre-game stage. During this time, the games machine is loading data such as the program for the main game, which takes a long time to be loaded. Therefore the player is completely unaware of this long loading time. This creates a synergistic effect in that no time is wasted and the preliminary game supports the main game, enabling the player to enjoy a more exciting game.

Characteristics of Operation of Games Machine

The characteristics of the operation of the games machine 700 of this embodiment will now be described with reference to FIG. 6.

Assume that this games machine 700 starts to load the games program and data that is stored in the external recording medium 100 at a time t1.

It first takes a time period T1 to load the program and data for the auxiliary game (alien-shooting game), which requires only a short time to be loaded.

The games machine then takes a time period T3 to load the program and data for the main game (car-racing game), while it is running this auxiliary game (alien-shooting game) during a time period T2.

It runs the main game (car-racing game) during a time period T4, after a time t3 at which the auxiliary game ends.

In other words, with this embodiment, the loading period for the main game (T3) is superimposed on the period during which the auxiliary game is running (T2), and these two processes execute simultaneously in parallel. Thus the loading period for the main game (T2) is not wasted.

Figure 6:
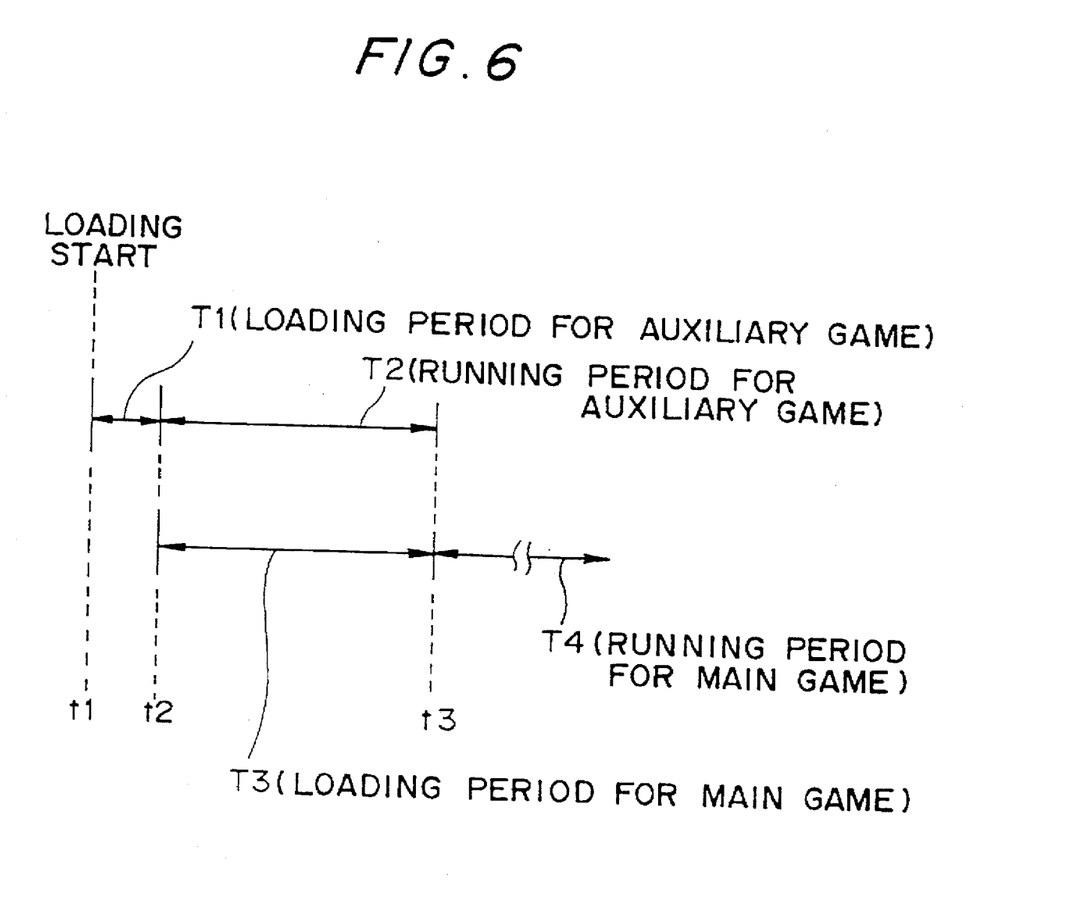
FIG. 6 is a diagram used to illustrate the characteristic of an example of the games machine of this invention.

Note that the time periods T2 and T3 are shown as being the same time in FIG. 6, but this invention should not be taken as being limited to this case.

In other words, the period T2 during which the auxiliary game is running is preferably set to be sufficiently long in comparison with the period T3 during which the main game is loaded. For example, if the period T3 during which the main game is loaded is approximately 10 seconds, the period T2 during which the preliminary game is running could be set to approximately 15 seconds. Thus the period T2 during which the auxiliary game is running is set as appropriate with respect to the period T3 during which the main game is loaded. Therefore, the player does not become irritated by a long waiting time and can start playing the game quickly, even if the main game is so large it takes some time to load.

Specific Operation of Games Machine

Figure 1:
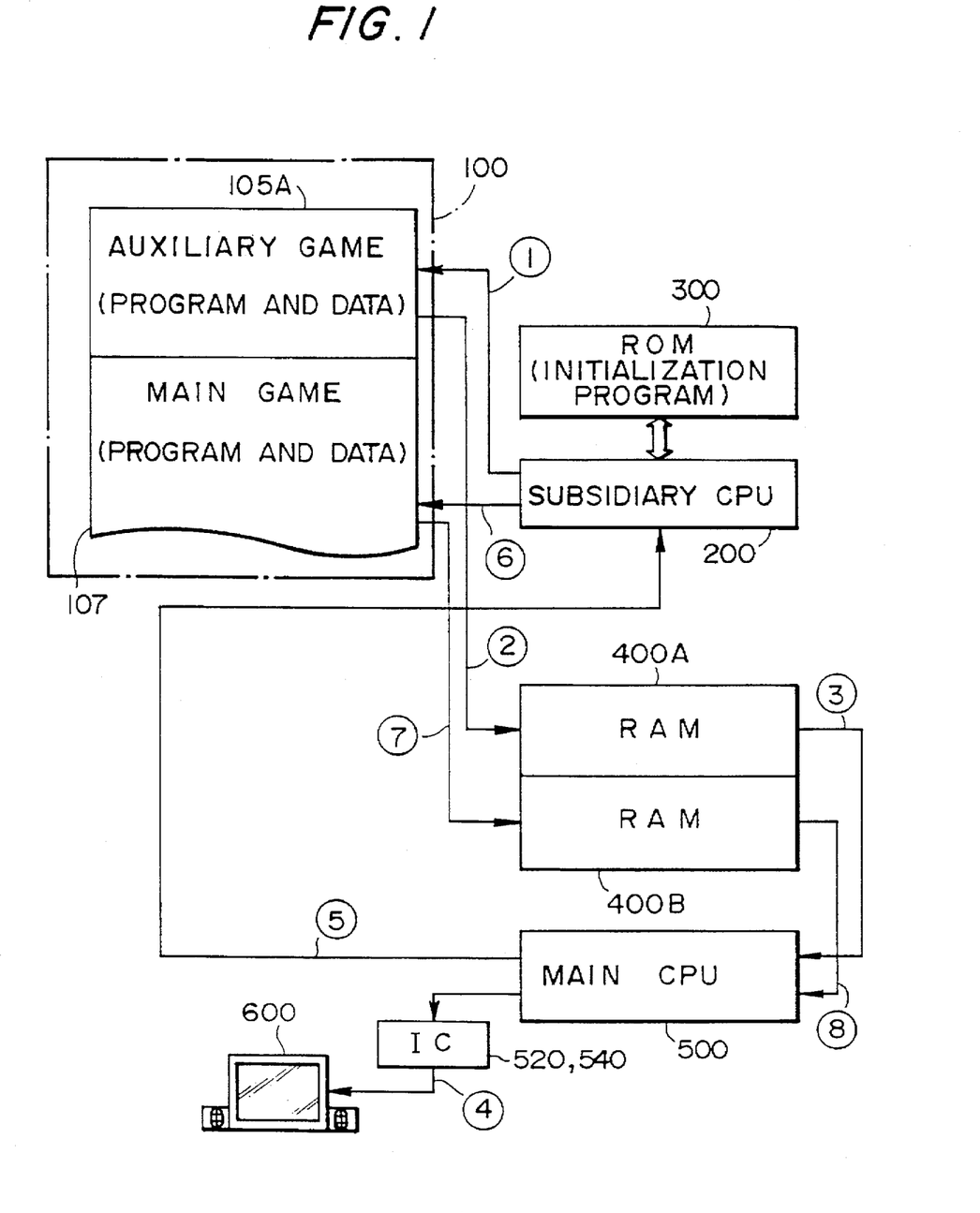
FIG. 1 is a diagram used to illustrate the operation of essential components of the games machine of this invention.

Specific details of the operation of the games machine of this embodiment will now be described with reference to FIG. 1.

The operation of loading game software from the external recording medium 100 is described below.

First of all, the subsidiary CPU 200 accesses an area 105A within the recording medium (step (1)), loads the program and data for the auxiliary game, and stores that data in a RAM area 400A (step (2)), in accordance with an initialization program stored within the ROM 300.

Next, the main CPU 500 reads this program and data for the auxiliary game from the RAM area 400A (step (3)), and decodes instructions therefrom. Various signals for image and other data are then sent to the monitor 600 through the audio synthesis chip 520 and the image synthesis chip 540, and the auxiliary game is run on the monitor 600 (step (4)).

The program for the above described auxiliary game also includes control commands that instruct the main CPU 500 to execute the loading of the program and data for the main game in parallel with the running of the auxiliary game.

The main CPU 500 decodes these control instructions included in the program for the auxiliary game that has been read from the RAM area 400A, then instructs the subsidiary CPU 200 (step (5)) to load the program and data for the main game from an area 107 in the external recording medium 100 and store it in a RAM area 400B (steps (6) and (7)).

Next, the main CPU 500 reads the program and data for the main game from the RAM area 400B (step (8)) and runs the main game. In this manner, the preliminary game is run in parallel with the loading of the program and data for the main game.

Figure 4:
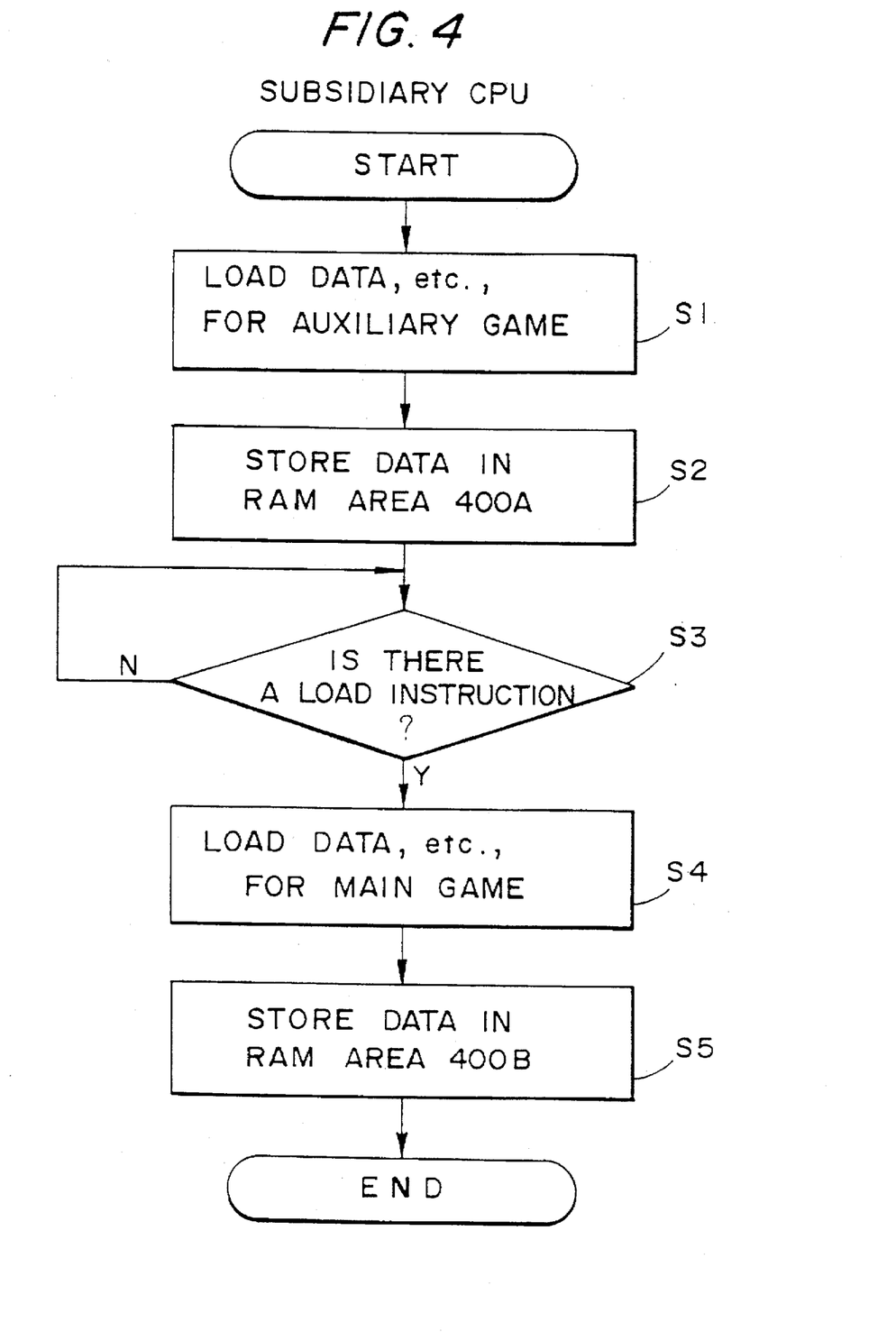
FIG. 4 is a flowchart of the operating sequence of the subsidiary CPU.

A flowchart of the operating sequence of the subsidiary CPU 200 is shown in FIG. 4.

The operating sequence of the subsidiary CPU 200 is described below on the basis of the circuitry shown in FIGS. 1 and 2.

First of all, when the external recording medium 100 is set in the games machine 700 and the operating switch of the games machine is pressed, the subsidiary CPU 200 of the games machine 700 first loads the games program and data for the auxiliary game that has a short loading time (step S1) and stores the loaded program and data in the RAM area 400A (step S2).

When the loading of the program and data for the auxiliary game ends, the subsidiary CPU 200 waits for a load instruction from the main CPU 500 for the program and data for the main game (step S3).

When the load instruction is input from the main CPU 500, the subsidiary CPU 200 loads the program and data for the main game from the external recording medium 100 (step S4) and stores it in the RAM area 400B (step S5).

Figure 5:
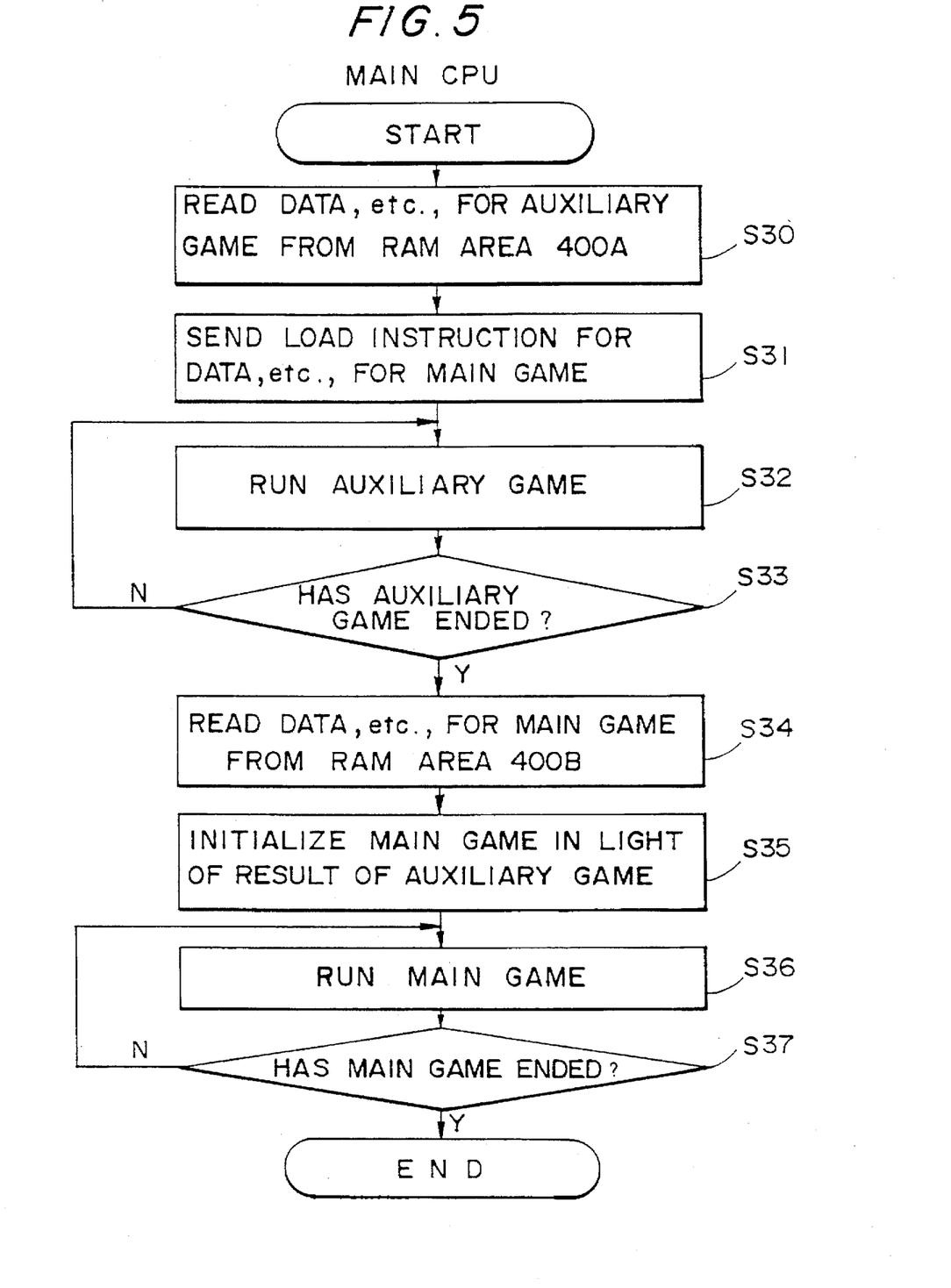
FIG. 5 is a flowchart of the operating sequence of the main CPU.

A flowchart of the operation of the main CPU 500 is shown in FIG. 5.

The main CPU 500 first reads out the program and data for the auxiliary game that is stored in the RAM area 400A (step S30).

It then sends the subsidiary CPU 200 a load instruction with respect to the data for the main game (step S31). On receiving this instruction, the subsidiary CPU 200 starts loading from the external recording medium 100 the games program and data for the main game, as described above (step S4 of FIG. 4). As mentioned previously, the loading of this program and data for the main game ends approximately 10 seconds after the start of the loading, and this data is stored in the RAM area 400B (step S5 of FIG. 4).

A game image is then displayed on the monitor 600 and the auxiliary game runs for approximately 15 seconds (step S32). This auxiliary game is intended to end approximately 15 seconds after it has started, giving plenty of time for the loading of the program and data for the main game to end while the auxiliary game is running.

When it is determined that the auxiliary game has ended (step S33), the main CPU 500 reads the program and data for the main game from the RAM area 400B (step S34).

The main CPU 500 then sets the initial conditions for the main game in light of the result of the auxiliary game (step S35). The instruction for setting these initial conditions is included in the program for the main game. The main CPU 500 then runs the main game (steps 36 and 37).

Figure 10:
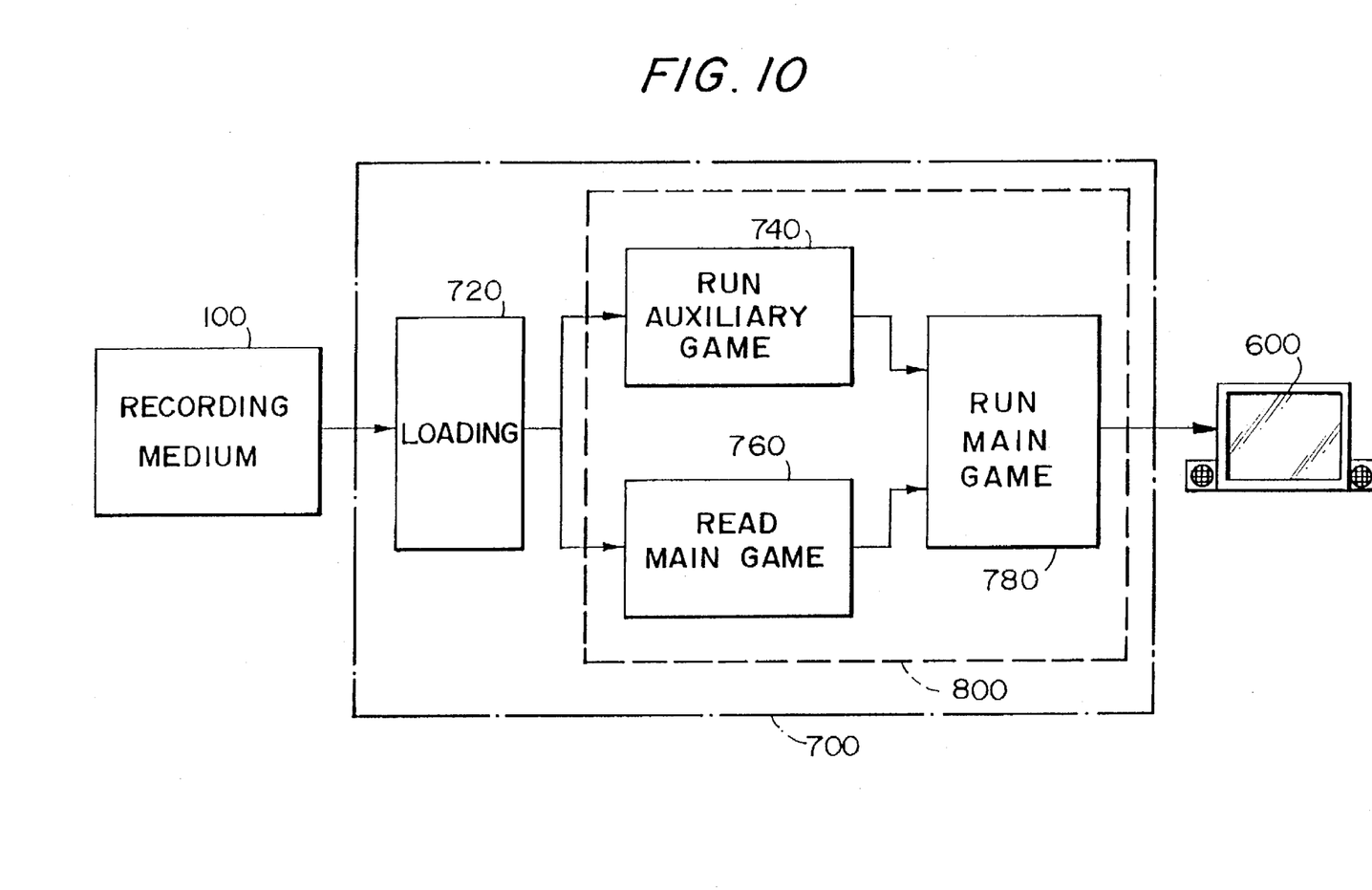
FIG. 10 is a functional block diagram of an embodiment of the games machine of this invention.

The configuration of the games machine of this embodiment is shown in FIG. 10 in the form of function blocks (where a function block is a means for implementing a predetermined function, constructed of hardware operating in accordance with software).

In other words, the games machine 700 is configured of a loading means 720 and an execution means 800, and the execution means 800 is further provided with an auxiliary game execution means 740, a main-game reading means 760, and a main game execution means 780.

While the auxiliary game execution means 740 is running the preliminary game, the main-game reading means 760 is reading the program and data for the main game in parallel. When the auxiliary game ends, the main game execution means 780 initializes the main game in the light of the result of the auxiliary game. The main game execution means 780 then runs the main game.

2. Second Embodiment

Figure 11:
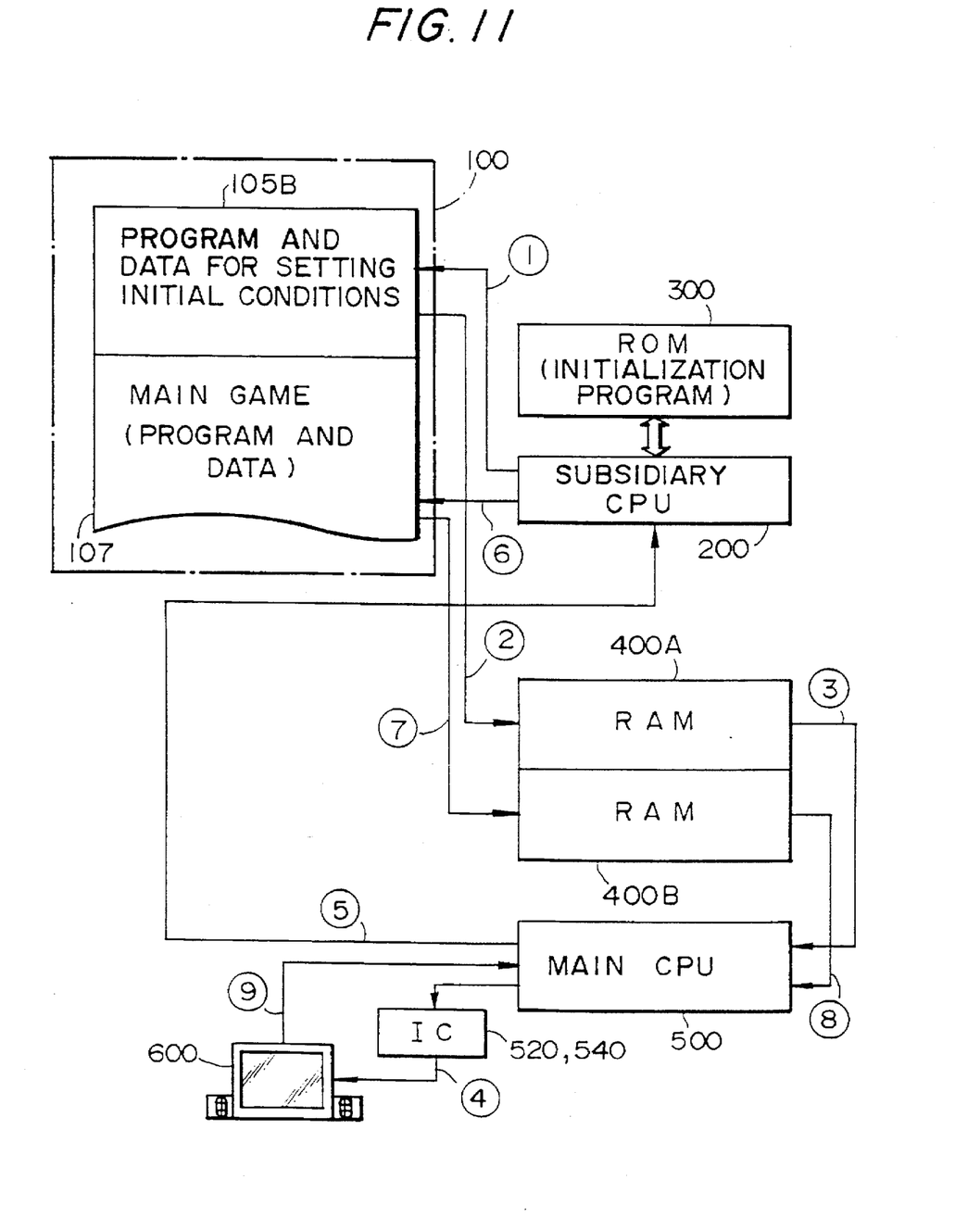
FIG. 11 is a diagram used to illustrate the operation of another embodiment of the games machine of this invention.

A diagram illustrating the operation of a second embodiment of the games machine of this invention is shown in FIG. 11.

This embodiment differs from the previous embodiment in that it is designed to set initial conditions for the main game, instead of running a preliminary game.

In other words, a program and data (105B) for setting the initial conditions is stored in the external recording medium 100 of this embodiment, as shown in FIG. 11, instead of the auxiliary game.

When the recording medium 100 is set in the games machine and the loading of data from the recording medium 100 starts, the program and data for setting the initial conditions is first loaded in a short period of time, and an initial condition setting image is displayed on the monitor 600. The player uses an input device such as a mouse to select preferred conditions while viewing this image.

Simultaneously with the end of the loading of this program and data for setting initial conditions, the loading of the program and data for the main game from the recording medium 100 starts.

In other words, the program and data for the main game is loaded and stored in the RAM area 400B while the player is selecting the initial conditions for the main game. At the same time, the conditions selected by the player are transferred to the main CPU 500 (step (9) in FIG. 11). After the main CPU 500 has set the initial conditions as selected by the player, it runs the main game.

Figure 12:
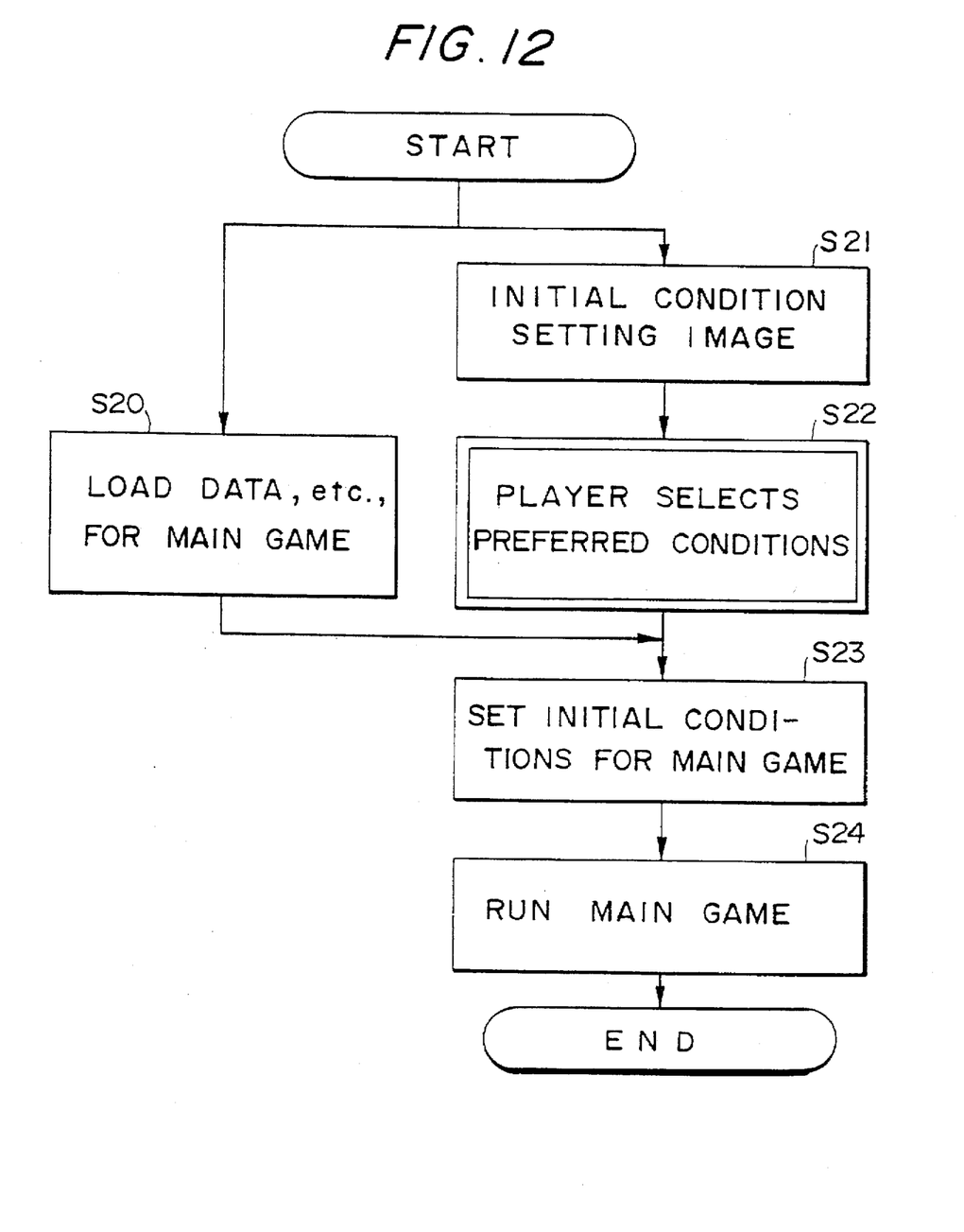
FIG. 12 is a flowchart used to illustrate the operation of this other embodiment of the games machine of this invention.

This operation is shown in FIG. 12.

The player sets preferred conditions while viewing the initial condition setting image (steps S21 and S22), and the program and data for the main game is loaded in parallel thereto (step S20). After the initial conditions for the main game have been set to correspond to the player's selections (step S23), the main game is run (step S24).

This means that the time required for loading the program and data for the main game can be utilized as time for setting the initial conditions of the main game. Therefore no time is wasted and the player can rapidly become immersed in playing the main game.

Note that this invention is not limited to the above described embodiments and it can be modified in many different ways.

For example, the above embodiments were each described by way of example as using a CD-ROM, which is an optical type of recording medium, as the recording medium 100, but this invention should not be taken as being limited thereto; a wide range of other types of recording medium could be used, such as a magnetic recording medium such as a floppy disk.

The above embodiments were also described by way of example as using a game that is completely different from the main game as the auxiliary game, but this invention should not be taken as being limited thereto; a collection of various different games could be used as the auxiliary game, if necessary. The auxiliary game could also be of the same type as the main game. In such a case, the auxiliary game could be used as practice to instruct the player in the rules of the main game.

What is claimed is:

1. A recording medium, comprising:
   computer readable auxiliary program code means for processing an auxiliary game; and
   computer readable main-game program code means for processing a main game, wherein a size of said auxiliary program code means is smaller compared to a size of said main-game program code means and wherein a relationship between said auxiliary program code means and said main-game program code means is such that said auxiliary program code means is always loaded first, before said main-game program code means.

2. A recording medium, comprising:
   computer readable auxiliary program code means for processing an auxiliary game; and
   computer readable main-game program code means for processing a main game, wherein a size of said auxiliary program code means is smaller compared to a size of said main-game program code means, said auxiliary program code means instructing a computer to process said auxiliary game and to load said main-game program code means in parallel with the processing of said auxiliary game.

3. A recording medium, comprising:
   computer readable auxiliary program code means for processing an auxiliary game; and
   computer readable main-game program code means for processing a main game, wherein a size of said auxiliary program code means is smaller compared to a size of said main-game program code means, said auxiliary program code means instructing a computer to process said auxiliary game and to load said main-game program code means in parallel with processing of said auxiliary game, said main game and said auxiliary game being related such that a result obtained by the processing of said auxiliary program code means by said computer is reflected in said main game.

4. A recording medium, comprising:
   first computer readable program code means having information relating to an essential content of a game; and
   second computer readable program code means for setting initial conditions for said game, wherein a size of said second program code means is smaller compared to a size of said first program code means, and a relationship between said first program code means and said second program code means is such that said second program code means is always loaded first, before said first program code means.

5. A method of loading games program code means from a recording medium into a games machine and performing predetermined processing therewith, wherein a main-game program code means and an auxiliary program code means are stored in said recording medium and when said games program code means is loaded and processed, said auxiliary program code means is loaded first in response to an initialization program in said games machine and then said main-game program code means is loaded.

6. The method of loading a games program code means as defined in claim 5, wherein a time required for loading said auxiliary program code means is set to be shorter than a time required for loading said main-game program code means.

7. A method of loading games program code means from a recording medium into a games machine and performing predetermined processing therewith, wherein a main-game program code means for a main game and an auxiliary program code means are stored in said recording medium and when said games program code means is loaded and processed, said auxiliary program code means is loaded and processed first, then said main-game program code means is loaded in parallel while said auxiliary program code means is being processed.

8. The method of loading a games program code means as defined in claim 7, wherein a time required for loading said auxiliary program code means is set to be shorter than a time required for loading said main-game program code means.

9. The method of loading a games program code means as defined in claim 7, wherein:
   said auxiliary program code means is program code means for an auxiliary game to be run before said main game.

10. The method of loading a games program code means as defined in claim 7, wherein:

said auxiliary program code means has information for setting initial conditions of said main game.

11. The method of loading a games program code means as defined in claim 7, wherein:

said recording medium is an external recording medium.

12. The method of loading a games program code means as defined in claim 7, wherein:

said recording medium is a CD-ROM.

13. A games machine that loads program code means from a recording medium in which are stored main-game program code means for a main game and auxiliary program code means, performs predetermined processing therewith, and runs a game while displaying a game image on a monitor, the games machine comprising:

loading means for loading said program code means from said recording medium; and execution means for running said main game using said program code means loaded by said loading means and for executing predetermined processing of reading and running of said game in accordance with said auxiliary program code means, wherein said execution means first performs said predetermined processing in accordance with said auxiliary program code means and then runs said main game.

14. A games machine that loads program code means from a recording medium in which are stored main-game program code means for a main game and auxiliary program code means, performs predetermined processing therewith, and runs a game while displaying a game image on a monitor, the games machine comprising:

loading means for loading said program code means from said recording medium; and execution means for running said main game using said program code means loaded by said loading means and executing predetermined processing of reading and running of said game in accordance with said auxiliary program code means, wherein said execution means first performs said predetermined processing in accordance with said auxiliary program code means while displaying said game image on said monitor, and said loading means loads said main-game program code means for said main game in parallel with said predetermined processing, and after said predetermined processing in accordance with said auxiliary program code means has ended, said execution means then runs said main game while displaying a main-game image on said monitor, using said main-game program code means for said main game that was loaded by said loading means.

15. The games machine as defined in claim 14, wherein said auxiliary program code means is program code means that runs an auxiliary game before said main game and said execution means first runs said auxiliary game and then runs said main game in accordance with a result obtained by a player of said auxiliary game.

16. The games machine as defined in claim 14, wherein:

said auxiliary program code means is program code means for setting initial conditions for said main game; and said execution means first executes a program for setting said initial conditions for said main game then runs said main game with initial conditions selected by a player.

\* \* \* \* \*